March 17, 1931.    H. MANN    1,797,007
ELECTRICAL APPLIANCE
Filed April 11, 1930

INVENTOR.
HUBERT MANN
BY
Allan B Mann
ATTORNEY.

Patented Mar. 17, 1931

1,797,007

UNITED STATES PATENT OFFICE

HUBERT MANN, OF NEW YORK, N. Y.

ELECTRICAL APPLIANCE

Application filed April 11, 1930. Serial No. 443,309.

This application is a continuation-in-part of my copending application, Serial No. 159,478, filed Jan. 6, 1927.

This invention relates generally to electrical apparatus, and particularly to electrical apparatus capable of detecting and/or recording a plurality of electrical currents at the same instant. Specifically, this invention comprises a new and improved type of galvanometer which can detect and record small electric currents received simultaneously from a plurality of sources.

It is important and highly desirable to be able to observe and/or record several electric currents at the same instant. For example, to cite one instance where this would be not only desirable but necessary, one may consider the applicability to certain physiological investigations. In the treatment of heart diseases it is necessary to carefully examine the electrical phenomena associated with the contraction of the heart. It is known, for instance, that almost any two separate points on the surface of the body will give a slight difference of potential during certain phases of the heart beat but the character of the record obtained depends on the proper selection of suitable points. In order to obtain a satisfactory record of electrical events taking place within the body it has heretofore been necessary to take simultaneous records with two or more galvanometers which were connected with the body by suitable electrodes in two or more directions. With such an arrangement it is possible to determine by means of mathematical analysis of the records obtained just what electrical events were taking place in the immediate vicinity of the heart muscle. A detailed explanation of this method with the explanation of its importance and uses is embodied in the publication "A Method of Analyzing the Electrocardiogram," by Hubert Mann, M. D., published in the Archives of Internal Medicine, March, 1920, Vol. XXV, pp. 283-294.

While it is possible to record a plurality of currents by means of a low voltage cathode ray oscillograph, yet due to the expensive, complicated and fragile nature of this instrument and because it is not suitable for the production of photographic records, it is not satisfactory as a practical instrument. Also, as far as I am aware, there is no type of galvanometer which is suited for the simultaneous measurement of more than a single current.

I have discovered and produced a novel and improved electrical apparatus which will respond simultaneously to a plurality of currents, which apparatus, is simple and rugged in nature, is easy to construct and operate, and has very few parts.

In order that my invention may be better understood I refer to the following detailed description in conjunction with the accompanying drawing which form a part of this application:

In the said drawing—

Figure 1:
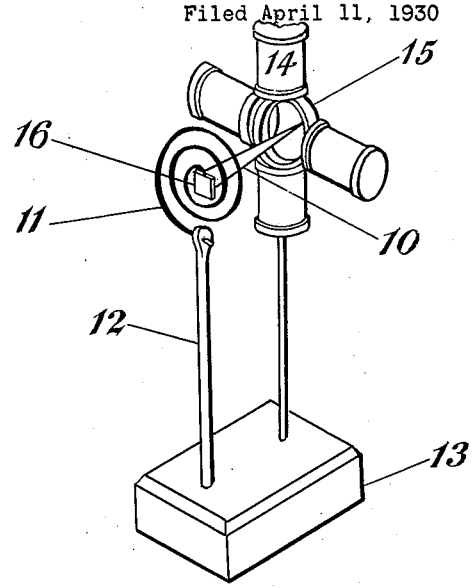
Fig. 1 shows diagrammatically and in perspective one form of my invention; and

Referring to Fig. 1, the apparatus consists of an elongated rod or needle 10 formed of some suitable magnetic material such as magnetized steel and suspended or supported at a single point at or near one end thereof by means of the spiral spring 11. One end of the spiral spring is suitably fixed to the member 10 while the other end thereof is suitably fastened to a supporting arm or member 12 which in turn is fixed to a base 13. Suitably mounted on this base 13 are a plurality of electromagnets 14, which may be connected to the circuit or circuits which are to be registered or detected.

These electromagnets are held in position by a supporting ring 15 of brass or other nonmagnetic material. While the figure shows four electromagnets arranged at right angles to each other, it will be obvious that the apparatus is not limited to the use of this number or arrangement of electromagnets.

The magnetic rod or needle 10 carries at or near the end at which it is suspended a mirror 16 or other suitable reflecting surface. This mirror is suitably and fixedly attached to the member 10. The other end of the magnetic rod or needle 10 is free and is positioned between and close to the electromagnets 14.

In the drawing I have shown the mirror 16 fixedly attached at the end at which it is suspended. However the exact point at which the mirror is suspended is not of great importance. The essential point is that the mirror should be rigidly attached to the moving member 10 in such a way that it will serve to indicate or record the motions of the moving member.

Figure 2:
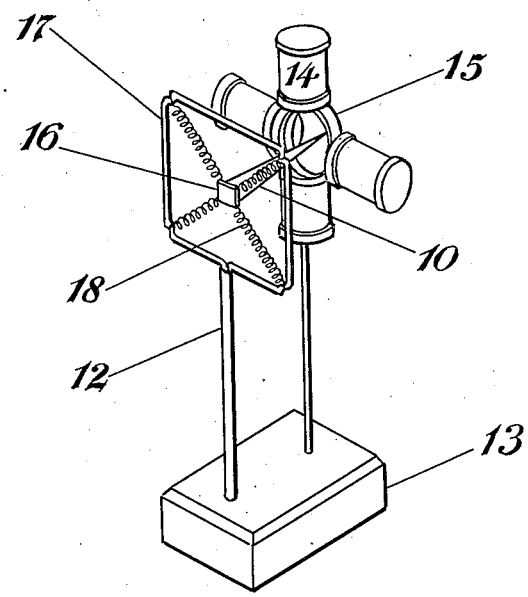
Fig. 2 is a view similar to Fig. 1 showing another form of my invention.

The construction of the form shown in Fig. 2 is identical with that shown in Fig. 1 except that the yielding supporting means for the rod or needle 10 is slightly varied. Instead of the spiral spring 11 there is a rectangular framework 17 attached at one portion thereof to the supporting arm or member 12, the framework carrying four helical springs 18 attached respectively to a corner of the framework and to member 10.

The operation of the apparatus may be explained as follows:

The electromagnets are connected to the circuit or circuits to be tested so that current flows therein. The current produces a magnetic field which alters the position of the rod 10 and consequently of the mirror 16 attached thereto. Now, since the rod 10, which is the moving part of the galvanometer, is suspended at a single point which is at or near one end of the rod 10 this rod is capable of universal motion. In the case, for example, where two electric impulses are caused to act upon the rod 10 through the medium of two electromagnets suitably connected to the sources of these impulses, the rod will move in the direction determined by the resultant of these impulses in accordance with the well-known parallelogram of forces. Thus the rod 10 is capable of responding simultaneously to two electric currents or two rectangularly related magnetic fields and its motion will consist of a composition of two simultaneous forces into a single vector.

In order that the instrument may be suitable for photographic recording the mirror 16 is attached to the rod 10. A beam of light from any convenient source reflected from this mirror will serve to indicate accurately the motions of the rod. The deflections of the mirror can be read directly by means of a scale if desired, or can be recorded photographically by means well known to the art. It will be obvious that because of the type of suspension of the rod 10 the mirror 16 can move in such a way as to deflect a beam of light in two directions both horizontally and vertically, thus producing combination curves or graphs in which vertical deflections represent conditions in one circuit while horizontal deflections represent conditions in a second. Thus by means of this invention two instead of only one deflection are produced and combined with the aid of only a single apparatus.

While I have shown and described two forms which my invention may assume, it will be apparent to those skilled in the art that many modifications may be made which will fall within the scope of my invention. Since the essential point is to suspend the moving system from one end so as to render it capable of motion in a plurality of directions, it will be obvious that many other types of suspension are possible besides those shown.

Obviously, while the forms illustrated show a moving magnet and fixed coils, it will be obvious to those skilled in the art that the same principles apply to an appropriate arrangement of fixed magnets and moving coils.

While the apparatus of my invention has been and is being used successfully by me in the medical arts, its use is by no means restricted to the field of medicine. It will be apparent that wherever a plurality of variables can be converted into electrical currents or magnetic fields the relationships between these variables can be recorded and examined by means of this new type of apparatus. For example, for the study of low frequency currents, of polyphase currents, of direct currents, my novel apparatus will be particularly useful. In order to illustrate a few of its possible uses I mention the following:

1. To indicate or record the ratio of input to output in motor generator equipment when operated at different speeds, different loads, different temperature conditions, etc.

2. To indicate or record the relation between light radiation and electrical input in a filament lamp or other illuminating device.

3. For the graphic determination of any two variables which can be expressed as electric currents.

The ability of this apparatus to respond simultaneously to two right angularly related fields, either A. C. (except perhaps alternating currents of very high frequency such as radio frequency) or D. C. is the characteristic which gives this instrument its unusual value. It is not intended, however, to limit the applicability of the instrument to its use with only two simultaneously operating currents. As noted above, by proper positioning of the electromagnets the apparatus may be used for the study of three phase currents and other phenomena of a polyphasic nature.

What is claimed is:

1. A galvanometer comprising a movable system and a fixed system, said movable system comprising a magnetized member suspended at one end thereof and carrying a reflecting surface, the other end being free, said fixed system comprising a plurality of electromagnets positioned to receive therebetween the free end of said magnetized member, said electromagnets being adapted to be energized simultaneously by a plurality of electric currents whereby the magnetized member is caused to move in the resultant direction of the magnetic forces set up by the electric currents.

2. Means for producing the resultant of a plurality of electric currents transmitted simultaneously from a plurality of points, said means comprising a base carrying movable and stationary magnetic means, said movable magnetic means being suspended at one end thereof so that the other end is free to respond to magnetic forces acting thereupon said stationary magnetic means being electromagnetic and adapted to receive electric impulses from the plurality of points and to act upon said movable magnetic means in response to the electric impulses received.

3. An apparatus adapted to indicate the resultant of a plurality of electric currents transmitted thereto from a plurality of sources of current, said apparatus comprising in combination a base, means comprising a magnetized rod suspended at one end thereof from said base and carrying a reflecting surface on said end, the opposite end thereof being free, a plurality of electromagnets adapted to be connected to said sources of current, said electromagnets being fixed to said base and suitably spaced to receive therebetween the free end of said magnetized rod.

HUBERT MANN.